United States Patent
Park

(10) Patent No.: US 9,154,655 B2
(45) Date of Patent: Oct. 6, 2015

(54) IMAGE FORMING APPARATUS AND METHOD FOR DISPLAYING PREVIEW IMAGE, AND SERVER AND METHOD FOR PROVIDING PREVIEW IMAGE

(75) Inventor: Seong-taek Park, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 138 days.

(21) Appl. No.: 12/923,991

(22) Filed: Oct. 19, 2010

(65) Prior Publication Data

US 2011/0179354 A1   Jul. 21, 2011

(30) Foreign Application Priority Data

Jan. 19, 2010  (KR) .................. 10-2010-0004878

(51) Int. Cl.
*G06F 17/21* (2006.01)
*H04N 1/00* (2006.01)
*G06F 3/12* (2006.01)
*G06F 17/22* (2006.01)
*H04N 1/44* (2006.01)

(52) U.S. Cl.
CPC ............ *H04N 1/0044* (2013.01); *G06F 3/1208* (2013.01); *G06F 3/1256* (2013.01); *G06F 3/1288* (2013.01); *H04N 1/0023* (2013.01); *H04N 1/00233* (2013.01); *H04N 1/00244* (2013.01); *H04N 1/00458* (2013.01); *H04N 1/00222* (2013.01); *H04N 1/4413* (2013.01); *H04N 2201/0082* (2013.01)

(58) Field of Classification Search
CPC ............... G06F 17/212; G06F 17/246
USPC ........................................ 715/274
See application file for complete search history.

(56) References Cited

U.S. PATENT DOCUMENTS

| | | | |
|---|---|---|---|
| 7,386,535 B1* | 6/2008 | Kalucha et al. | 1/1 |
| 7,934,157 B2* | 4/2011 | Kimura | 715/274 |
| 8,014,013 B2* | 9/2011 | Owen et al. | 358/1.15 |
| 8,135,864 B2* | 3/2012 | Simpson et al. | 709/248 |
| 2002/0042798 A1* | 4/2002 | Takei et al. | 707/500 |
| 2002/0049794 A1* | 4/2002 | Hara | 707/527 |
| 2003/0195926 A1* | 10/2003 | Miyazaki | 709/203 |
| 2004/0032621 A1* | 2/2004 | Suzuki et al. | 358/1.18 |
| 2004/0174561 A1* | 9/2004 | Fukunaga et al. | 358/1.15 |
| 2006/0230030 A1* | 10/2006 | Volpa et al. | 707/3 |
| 2006/0242118 A1* | 10/2006 | Engel | 707/3 |
| 2007/0091360 A1* | 4/2007 | Iizuka | 358/1.15 |
| 2008/0198415 A1* | 8/2008 | Hattori | 358/1.17 |

(Continued)

FOREIGN PATENT DOCUMENTS

CN   1476981   2/2004

OTHER PUBLICATIONS

Chinese Office Action dated May 5, 2014 from Chinese Patent Application No. 201110021270.7, 26 pages.

*Primary Examiner* — James J Debrow
(74) *Attorney, Agent, or Firm* — Staas & Halsey LLP

(57) ABSTRACT

A method of displaying a preview image from an image forming apparatus. The displaying method includes receiving a preview image request, requesting to an outer server a preview image requested from a user among total pages comprising a pint data according to the preview image request, receiving a preview image on requested pages from the outer server, and displaying the received preview image. Accordingly, the preview image can be generated and displayed quickly.

26 Claims, 13 Drawing Sheets

(56) References Cited

U.S. PATENT DOCUMENTS

| | | | |
|---|---|---|---|
| 2009/0037812 A1* | 2/2009 | Asai | 715/274 |
| 2009/0241024 A1* | 9/2009 | Shiohara | 715/274 |
| 2009/0303522 A1* | 12/2009 | Konsella | 358/1.15 |
| 2009/0310172 A1* | 12/2009 | Miyamoto | 358/1.15 |
| 2010/0027055 A1* | 2/2010 | Mori | 358/1.5 |
| 2010/0238488 A1* | 9/2010 | Alaghband et al. | 358/1.15 |
| 2011/0194135 A1* | 8/2011 | Hamilton et al. | 358/1.14 |
| 2011/0205592 A1* | 8/2011 | Nakagiri et al. | 358/1.15 |

* cited by examiner

FIG. 5A

Login User : John Doe

☑ AA.DOC (20 pages)    Preview
☐ BB.TXT (3 pages)     Print
☐ CC.GUL (12 pages)    Delete
☐ DD.BMP (1 page)      Logout

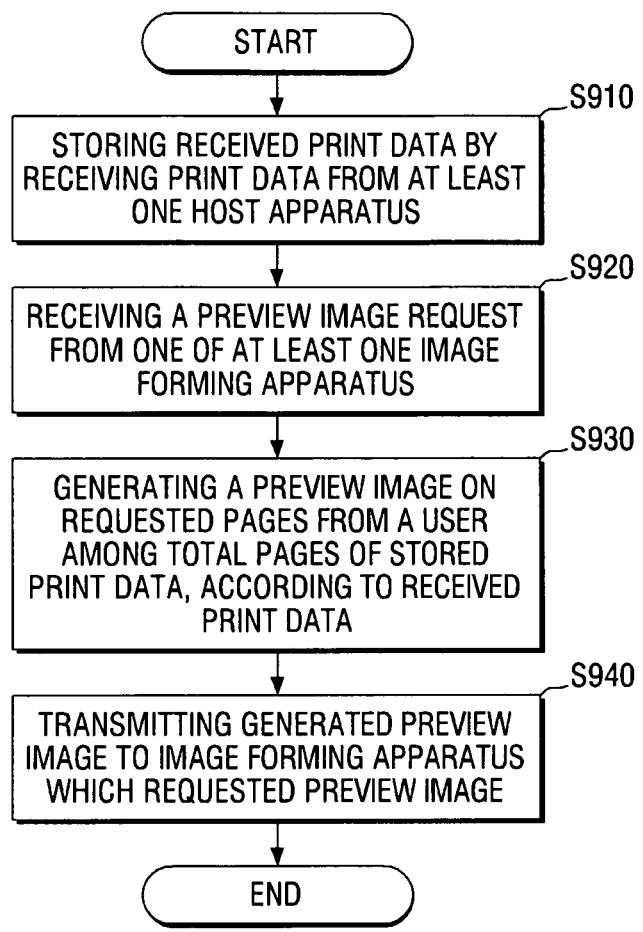

IMAGE FORMING APPARATUS AND METHOD FOR DISPLAYING PREVIEW IMAGE, AND SERVER AND METHOD FOR PROVIDING PREVIEW IMAGE

CROSS-REFERENCE TO RELATED APPLICATIONS

This application claims priority under 35 U.S.C. §119 from Korean Patent Application No. 2010-04878, filed on Jan. 19, 2010, in the Korean Intellectual Property Office, the disclosure of which is incorporated herein by reference in its entirety.

BACKGROUND

1. Field

Apparatuses and methods consistent with the present invention relate to an image forming apparatus and a method for displaying a preview image, and a server and a method for providing a preview image, and more particularly, to an image forming apparatus which can reduce displaying time of the preview image and a method for displaying a preview image and a server and a method for providing a preview image.

2. Description of the Related Art

An image forming apparatus performs generating, printing, receiving, and transmitting an image data. The most exemplary image forming apparatus is a printer, scanner, copy machine, facsimile machine and multi function peripheral which integrates these functions into one device.

Image forming apparatuses reflecting various needs of consumers have been introduced with development of image forming apparatus technology.

Particularly, an image forming apparatus based on pull printing is widely adopted for security and resource conservation reasons, when the image forming apparatus is shared in a company or a government organization.

A related art an image forming apparatus on a pull printing basis has a problem that it takes a long time to generate and display It took a long time to generate a preview image on pint data and display it on the image forming apparatus by using a current method, if the preview image is displayed on a LCD window of an image forming apparatus on a pull printing basis. The current method means generating a preview image on total print data and then displaying the generated preview image.

Moreover, another problem is that the conventional method, which generates a thumbnail representing total print data and displays the thumbnail, could not check various functions applied to print data.

SUMMARY

Exemplary embodiments address at least the above problems and/or disadvantages and other disadvantages not described above. Also, the present invention is not required to overcome the disadvantages described above, and an exemplary embodiment of the present invention may not overcome any of the problems described above.

The present invention provides an image forming apparatus, which displays a preview image of a page requested by a user among total pages of print data, and a method for displaying a preview image there of, and a server and a method for providing a preview image.

According to an exemplary aspect, there is provided a preview-image displaying method of an image forming apparatus which includes a communication interface unit which communicates with an outer server, a print engine unit which receives print data from the outer server and prints the print data, a display unit, and an input unit, and performs a pull printing of the print data stored in the outer server, the method including: receiving a request for a preview image through the input unit, requesting the outer server to provide a preview image on a page requested from a user among total pages forming print data according to the preview image request through the communication interface unit, receiving a preview image of the requested page from the outer server through the communication interface unit, and displaying the received preview image on the display unit.

The receiving may receive a preview image on designated pages, according to a preview image request on the designated pages from a user among the total pages.

The preview-image displaying method may further include storing the received preview image.

The displaying may display a preview image of one page among the requested pages, and the storing may store a preview image of at least one following page coming after the one page.

The preview-image displaying method may further include: storing the received preview image, displaying a preview image of a preceding page among a plurality of preview images, if the received preview image includes a plurality of images, displaying a preview image of a 1st following page among the stored preview images, if a display request on a preview image of the 1st following page coming after the page is input, requesting the outer server to provide a preview image of a 2nd following page, if a preview image of the 2nd following image coming after the 1st following image is not recorded while the preview image of the 1st following image is being displayed, and receiving and storing the preview image of the 2nd following page.

According to an exemplary aspect, there is provided a preview-image providing method of a server which connected to at least one host apparatus and at least one image forming apparatus, the method including: receiving print data from the at least one host apparatuses and storing the received print data; receiving a request for a preview image from one of the at least the image forming apparatuses, generating a preview image on a page requested from a user among total pages of the stored print data according to the received preview image request, and transmitting the generated preview image to the image forming apparatus which requested the preview image.

The preview-image providing method may further include: storing attribute information of the print date and a user information wherein the generating the preview image generates the preview image based on the stored print data, the attribute information of the print data, and the user information.

According to an exemplary aspect, there is provided an image forming apparatus which includes a print engine unit, which receives print data from an outer server and prints the print data, and performs a pull printing of the print data stored in the outer server, the apparatus including: a display unit which displays an image, an input unit which receives a preview image request, a communication interface unit which requests an outer server to provide a preview image on a page requested from a user among total pages of the print data according to the preview image request, and receives a preview image of the requested pages from the outer server; and a control unit which controls the display unit to display the received preview image.

The control unit may control the communication interface unit to transmit to the outer server a preview image request according to a preview image request policy which is set previously.

The communication interface unit may receive a preview image on designated pages according to a preview image request on the designated pages from a user among the total pages.

The image forming apparatus may further include a storage unit which stores the received preview image.

The display unit may display a preview image of one page among the requested pages, and wherein the storage unit records a preview image of at least one following page coming after the one page.

The control unit may control the display unit to display a preview image of a preceding page among a plurality of preview images, if the received preview image consists of a plurality of images; and to display a preview image of a 1st following page among the stored preview images, if a display request on a preview image of the 1st following page coming after the preceding page is input.

The communication interface unit may request the outer server to provide a preview image of the 2nd following page, if a preview image of the 2nd following page coming after the 1st following page is not recorded while the preview image of the 1st following page is being displayed, wherein the storage unit receives and stores the preview image of the 2nd following page.

According to an exemplary aspect, there is provided a server which is connected to at least one host apparatus and at least one image forming apparatus, the server including: a storage unit which receives print data from the at least one host apparatus and stores the received print data, a communication interface unit which receives a preview image request from one of at least one image forming apparatus, a generating unit which generates a preview image on a page requested from a user among total pages of the stored print data according to the received preview image request, and a communication interface unit which transmits the generated preview image to the image forming apparatus which requested the preview image.

The storage unit may store attribute information of the print data and user information, and wherein the generating unit generates the preview image based on the stored print data, the attribute information of the print data, and the user information.

BRIEF DESCRIPTION OF THE DRAWINGS

The above and/or other aspects will be more apparent by describing certain exemplary embodiments with reference to the accompanying drawings, in which:

FIGS. 5A to 5C are views of an example of a display unit;

FIG. 9 is a flowchart of providing a preview image of a server according to an exemplary embodiment.

DETAILED DESCRIPTION

Figure 1:
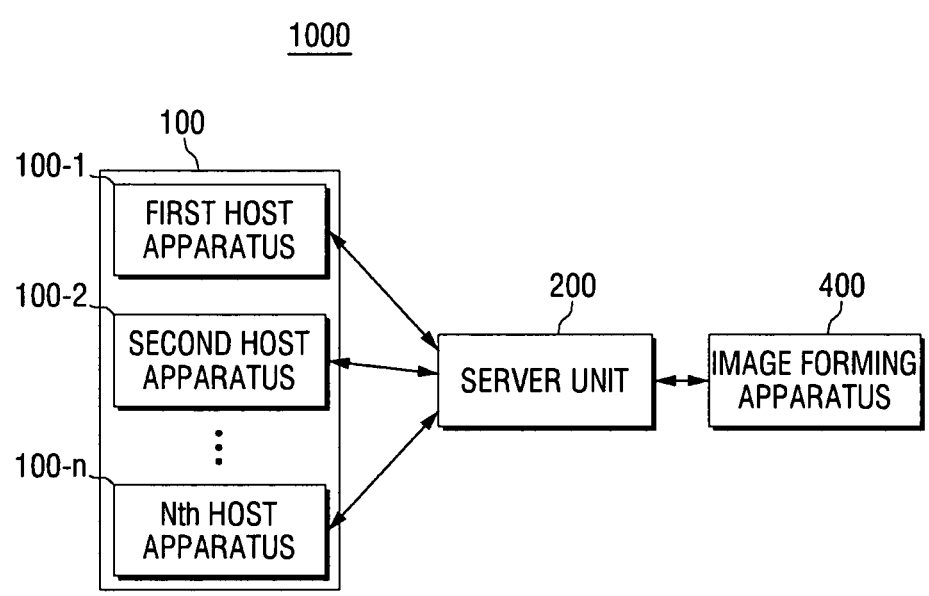
FIG. 1 is a view of an image forming system according to an exemplary embodiment.

Certain exemplary embodiments will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

FIG. 1 is a view of an image forming system according to an exemplary embodiment. With reference to FIG. 1, the image forming system 1000 includes at least one host apparatus 100, a server unit 200, and an image forming apparatus 400.

The image forming system 1000 is related to a system to perform pull printing, rather than direct printing or push printing.

Pull printing does not print immediately in the image forming apparatus 400, even though a user inputs a print command in the host apparatus 100, and prints a stored print data in the server unit 200, if a user requests additional printing after user authorization is completed in the image forming apparatus 400.

At least one host apparatus 100 includes a first host apparatus 100-1, a second host apparatus 100-2, and a nth host apparatus 100-n. For example, if a print button is selected in a print control window of an application being operated in the first host apparatus 100-1, print data is generated and is transmitted to the server unit 200. The print data can be a print job and the print data may consist of at least one page.

At least one host apparatus 100 may include a communication interface unit (not illustrated) to communicate with the server unit 200 in wired and wireless ways.

The server unit 200 may receive print data from the at least one host apparatus 100. Moreover, when user authentication is carried out, identification information to display a list of print data stored in the server unit 200 is transmitted to the image forming apparatus 400 which carried out the authentication.

Moreover, if the server unit 200 receives a preview image request from any one of the at least one image forming apparatus 100, the server unit 200 generates a preview image on the requested pages from a user among a plurality of pages of the stored print data, and transmits the generated preview image to the image forming apparatus 400 which requested the preview image.

While the preview image is an image to be printed out, a thumbnail image is a symbol or an image representing the image to be printed out. Accordingly, even if a thumbnail image is displayed, that is not an image to be printed out. Moreover, the preview image can display an image set with a specific function such as N-up printing, unlike a thumbnail image.

The server unit 200 may be arranged outside of the image forming apparatus 400, so the server unit can be an outside server.

The image forming apparatus 400 displays a print data list on the display screen using identification information transmitted from the server unit 200.

The image forming apparatus 400 operates on a pull printing basis, so it can receive the identification information or print data stored in the server unit 200 after going through user authentication.

The image forming apparatus 400 requests the server unit 200 to provide a preview image for a page requested from a user among total pages of print data according to the preview image request, receives the preview image of the requested page from the server unit 200, and displays the received preview image.

The image forming apparatus 400 performs a function corresponding to a received print command, if the print command is received from the user.

The image forming apparatus 400 may be a printer, scanner, copy machine, fax, and Multi-Functional Peripheral (MFP) which integrates these functions into one device.

Figure 2:
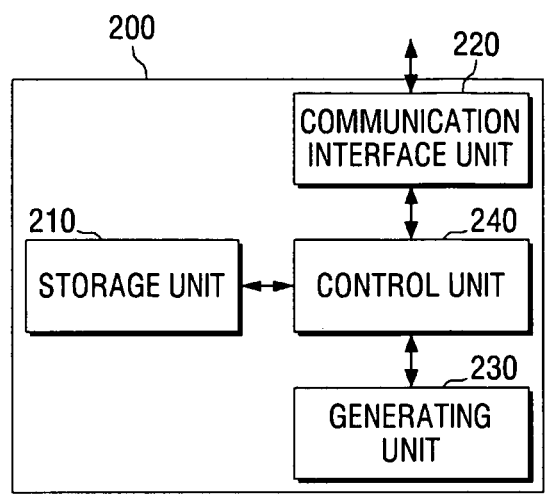
FIG. 2 is a view of a server according to an exemplary embodiment.

FIG. 2 is a view of the server unit 200 according to an exemplary embodiment. With reference to FIG. 2, the server unit 200 includes a storage unit 210, a communication interface unit 220, a generating unit 230, and a control unit 240.

The storage unit 210 stores print data received from the at least one host apparatus 100. The storage unit 210 also stores attribute information of the print data and a user information.

As an example, the storage unit 210 may be classified as a first server (not illustrated) where the received print data is stored and as a second server (not illustrated) where the attribute information of the print data and the user information are stored. In this case, the first server may be a spool server and the second server may be an index server. However, the first server (not illustrated) and the second server (not illustrated) may be integrated into one element, and that is the server unit 200.

The communication interface unit 220 receives a preview image request from one of the at least one image forming apparatus 100. The communication interface unit 220 transmits a generated preview image to the image forming apparatus 400 which requested the preview image.

The generating unit 230 generates a preview image on the page requested from the user among a plurality of pages of a stored print data according to the received preview image request. The generating unit 230 may be expressed by the term "preview engine."

The preview image generated by the generating unit 230 may be based on the stored print data, the stored attribute information of the print data, and the stored user information. The preview image may be an image file with extensions such as JPG, BMP.

The attribute information of the print data may indicate a print data name, a form such as PCL, PCLXL, PostScript, a total page number and size of the print data, a size and a direction of designated print paper, a generated date and time in the host apparatus 100, a registered date and time in the server unit 200, a color information such as color/mono, an information whether print data remains or not after performing printing, a designated option information such as a duplex or simplex print, a designated option information such as N-up printing, and an image forming apparatus where the print data concerned is allowed to be output.

Moreover, the user information may be information about a user who is allowed to access a print data, authority, and a user who generates or transmits the print data.

The identification information may be at least one item of the attribute feature information of the print data and the user information The control unit 240 generally controls the functions of the storage unit 210, the communication interface unit 220, and the generating unit 230. As an example, the control unit 240 controls the storage unit to store a received print data received through the communication interface unit 220. The control unit controls the communication interface unit 220 to transmit the generated preview image to the image forming apparatus 400.

Figure 3A:
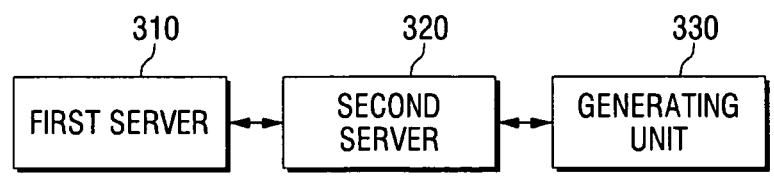
FIGS. 3A to 3C are views of various examples of arrangement of a first server, a second server, and a generating unit.
Figure 3B:
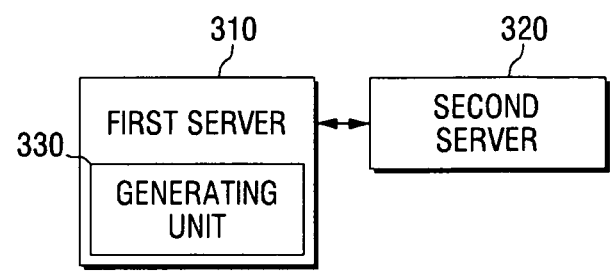
Figure 3C:
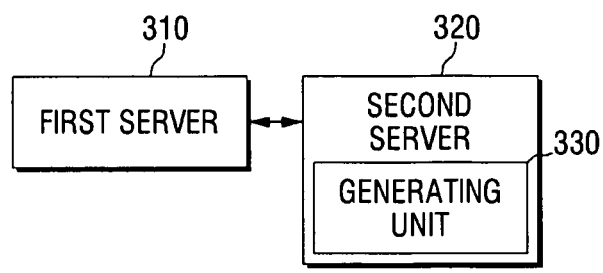

FIGS. 3A to 3C are views of various examples according to an arrangement of the first server, the second server and the generating unit.

Unlike FIG. 2 where a spool server and an index server are integrated into the server unit 200, FIG. 3A illustrates that the server unit 200 includes the first server 310, which is the spool server, and the second server 320, which is the index server, separately. Moreover, the generating unit 330, which is a print engine unit, may be a separated configuration from the first server 310 and the second server 320.

Unlike FIG. 3A, the generating unit 330 may be arranged between the first server 310 and the second server 320.

With reference to FIG. 3B, the server unit 200 according to another exemplary embodiment may be a separate configuration from the first server 310 and the second server 320. However, the generating unit 330 may be included in the first server 310.

With reference to FIG. 3C, the server unit 200 according to still another exemplary embodiment may be a separate configuration from the first server 310 and the second server 320. However, the generating unit 330 may be included in the second server 320.

The functions of the first server 310, the second server 320 and the generating unit 330 illustrated in FIGS. 3A to 3C are the same as those of FIG. 2, therefore the overlapped functions will not be explained.

With reference to FIGS. 2 and 3A to 3C, the server unit 200 according to yet another exemplary embodiment may be arranged within the image forming apparatus 400. The server unit 200 may be realized within the image forming apparatus 400 in various forms as illustrated in FIGS. 3A to 3C.

If user authentication is carried out in the image forming apparatus 400, the server unit 200 may perform a responsive function in the image forming apparatus 400. On the other hand, user authentication is carried out in another image forming apparatus (not illustrated), the server unit 200 may transmit data to perform a responsive function to another image forming apparatus which is connected to the image forming apparatus 400 by wire and wireless network.

Figure 4:
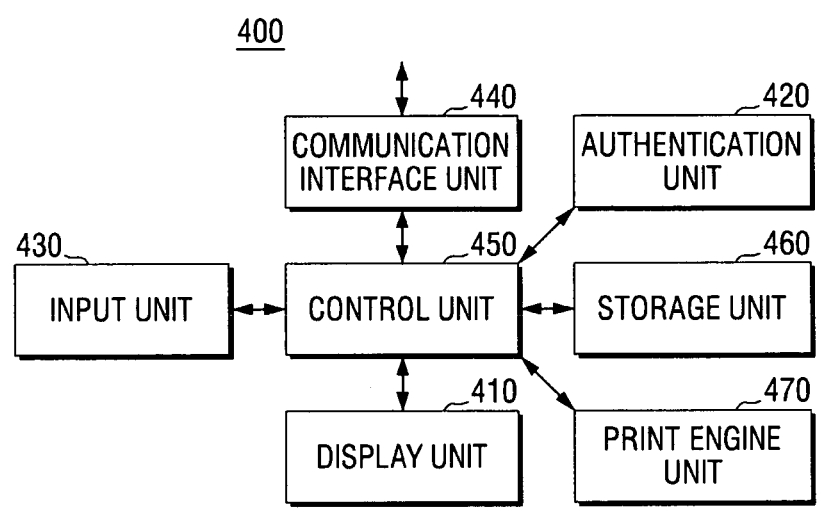
FIG. 4 is a view of an image forming apparatus according to an exemplary embodiment.

FIG. 4 is a view of an image forming apparatus according to an exemplary embodiment. With reference to FIG. 4, the image forming apparatus 400 includes a display unit 410, an authentication unit 420, an input unit 430, a communication interface unit 440, a control unit 450, a storage unit 460, and a print engine unit 470.

The display unit 410 displays an image. As an example, the display unit 410 may be a LCD window generated in a particular section of the image forming apparatus 400.

When user authentication is carried out in the image forming apparatus 400, the display unit 410 can display a print data list along with other identification information. That will be explained later with reference to FIG. 5A.

Moreover, the display unit 410 may display a received preview image. As an example, if the communication interface unit 440 receives a preview image on designated pages, the display unit 410 may display the preview image of the designated page.

As an another example, if the communication interface unit 440 receives a preview image on pages requested from a user among total pages, the display unit 410 can display a preview image of one page among the pages requested from the user.

The display unit 410 may provide a touch screen function, and in this case, the display unit 410 may also perform the function of the input unit 430 which will be explained later.

The authentication unit 420 carries out user authentication in the image forming apparatus 400. The authentication unit 420 may carry out user authentication using a user identification card or Personal Identification Number (PIN).

The input unit 430 receives a preview image request. As an example, the input unit 430 may be realized with an operation panel including a diverse of buttons.

The communication interface unit 440 requests the server 200 to provide a preview image on a page requested from a user among total pages of a print data, according to the preview image request. The communication interface unit 440 receives the preview image on the page requested from the user from the server unit 200.

In detail, the communication interface unit 440 may receive the preview image of the page designated according to a preview image request on requested pages from a user among total pages.

The control unit 450 carries out control function in general.

In detail, the control unit 450 controls the communication interface unit 440 to request the server unit 200 to provide a preview image on requested pages from a user among total pages, and controls the display unit 410 to display the received preview image.

The control unit 450 controls the communication interface unit 440 to transmit to the outer server a preview image request according to a preview image request policy which is set previously. The preview image request policy can be changed by an administrator.

The pre-set preview image request policy, as an example, may request a preview image of the first page among the total print data stored in the server unit 200. The policy may request a preview image of the page, which is selected by the user, or the page coming after the selected page. As an example, the policy may request a preview image of the first to the third pages among the total print data stored in the server unit 200.

The pre-set preview image request policy may request a preview image of the page, which is found first from image-contained pages of the total print data stored in the server unit 200.

In detail, if the first and the second pages among the total print data include only text and the third page includes an image, a preview image of the third page may be received among the preceding pages, according to the preview image request policy mentioned above.

Also, the policy may request a preview image of a page, which is found first, among text-only pages among the total print data stored in the server unit 200.

The control unit 450 controls the display unit 410 to display a preview image of the preceding page among a plurality of preview images, if a plurality of images are received, and to display a preview image of a 1st following page among the stored preview images, if a display request on a preview image of the 1st following page coming after the preceding page is input.

In this case, the communication interface unit 440 requests the server unit 200 to provide a preview image of the 2nd following page, if the preview image of the 2nd following image coming after the 1st following image is not stored while the preview image of the 1st following image is being displayed.

The storage unit 460 receives and stores the preview image of the 2nd following page.

The storage unit 460 stores the received preview image and the preview image request which is set previously.

If the communication interface unit 440 receives a preview image on requested pages among total pages, the display unit 410 displays a preview image on one page among the requested pages, and the storage unit 460 records a preview image on at least one following page coming after the displayed page.

The print engine unit 470 prints, if a print request is input by a user through the input unit 430.

The image forming apparatus 400 may further include a scanning unit (not illustrated) to perform a scanning function in addition to the print engine unit 470.

The image forming apparatus 400 may further include a decision unit (not illustrated) to find whether a preview image remains in the storage unit 460. Therefore, according to the decision from the decision unit, the image forming apparatus 400 may request the server unit 200 to provide a preview image of a page which is not stored.

Accordingly, the image forming apparatus 400 may reduce waiting time to find a preview image, even if the size of print data is big, and may not need a lot of space to store a preview image. Even if the image forming apparatus 400 does not have enough space, displaying a preview image is not very limited. The image forming apparatus 400 can prevent generating a preview image which is not checked by a user, avoiding performing unnecessary functions. Accordingly, a user can enjoy more convenience.

Figure 5B:
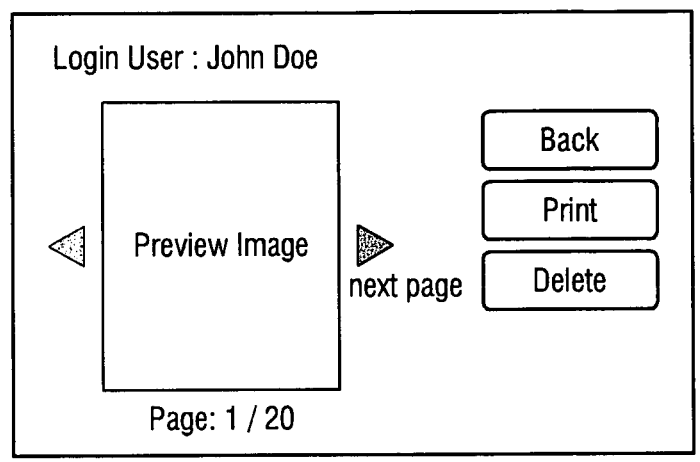
Figure 5C:
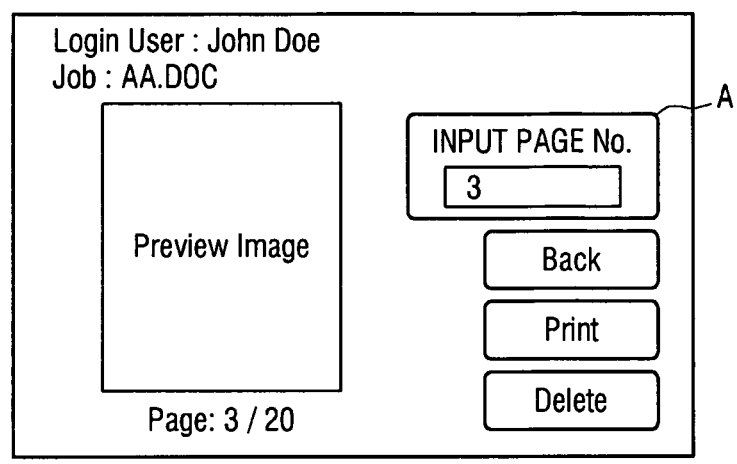

FIGS. 5A to 5C are views of an example of a display unit.

With reference to FIG. 5A, the display unit 410 uses identification information including attribute information of print data and user information, thus displaying a print data list. The display unit 410 illustrated in FIG. 5A is a display after going through user authentication in the authentication unit 420.

If a user chooses a print data, for example an 'AA.DOC' file, and pushes a preview button, a preview image of the AA.DOC file is displayed on the display unit 410. In this case, the AA.DOC file is stored in the server unit 200 in advance in the form of print data including 20 pages.

The AA.DOC file may be directly provided by a user, but may be also provided for the user by a third party. In detail, on a pull printing basis, if a user performs user authentication in the image forming apparatus 400 in a state when the print data provided by the third party is stored in the server unit 200, the print data information is displayed on the display unit 410 of the image forming apparatus 400.

After a preview image of the requested pages among the total pages of the print data by a user, who chooses the AA.DOC file and pushes the preview button, and even if the print engine unit 470 performs a print function by the image forming apparatus 400, the AA.DOC file may remain in the server unit 200. On the other hand, the AA.DOC file may be deleted from the server unit 200, if the print engine unit 470 of the image forming apparatus 400 performs the print function.

The AA.DOC file may be deleted in the display unit 410 by a user, regardless of the print function in the print engine unit 470 of the image forming apparatus 400.

FIG. 5B illustrates an example of displaying a real preview image on the display unit 410, if a preview button is selected in FIG. 5A. In detail, the display unit 410 displays total pages of print data in a consecutive way. Regarding this, detailed operation will be explained along with FIG. 6.

Unlike FIG. 5B, FIG. 5C illustrates that the display unit 410 displays a preview image on designated pages among total pages of a print data. FIG. 5C illustrates a preview image of the third page among total pages of the print data. Since then, if the user changes the designated pages, the control unit 450 controls the communication interface unit 440 to request an outer server to provide a preview image of the changed page.

Such operations will be explained in detail along with the FIG. 7.

Figure 6:
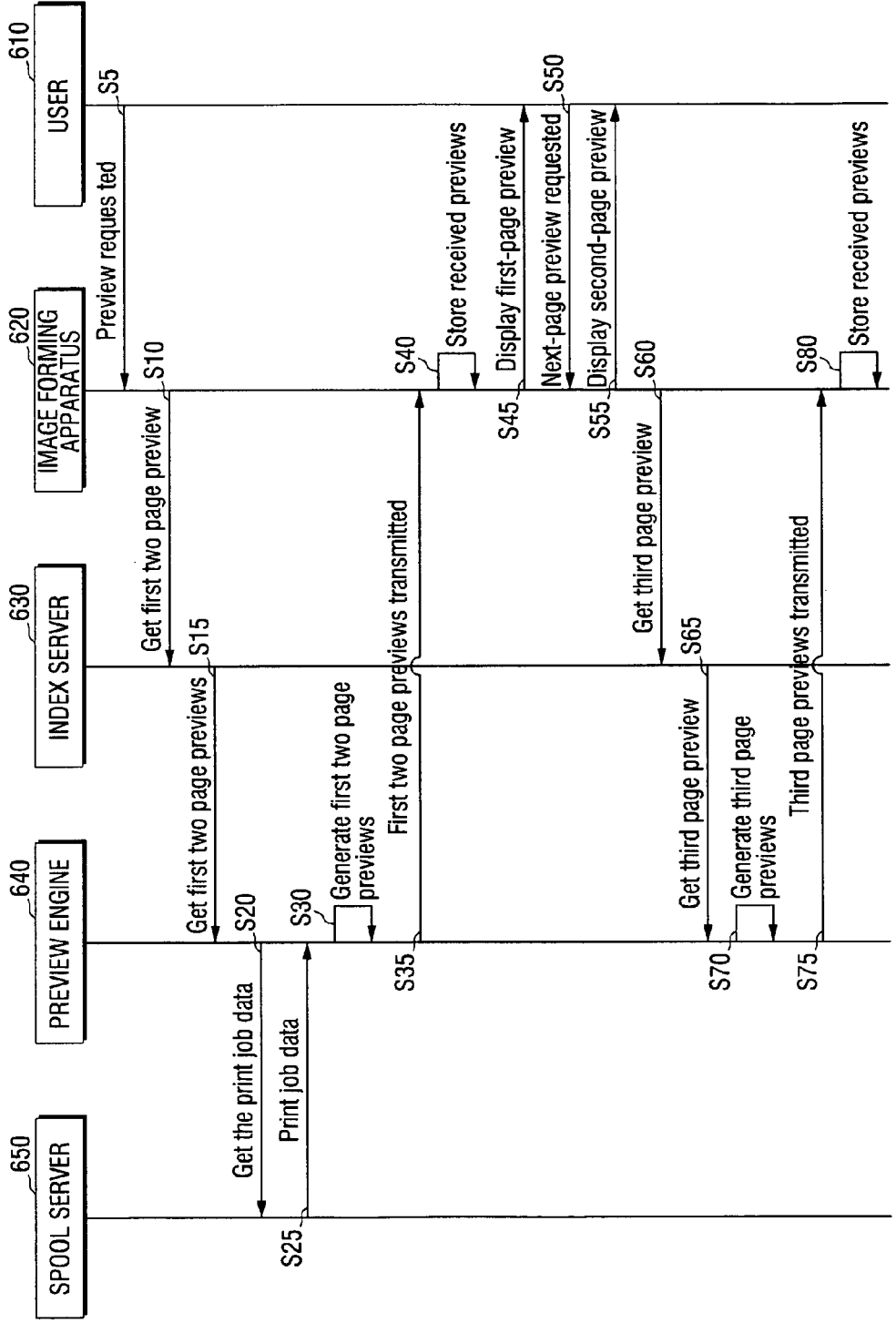
FIG. 6 is a view to explain a method for displaying a preview image of an image forming apparatus according to an exemplary embodiment.

FIG. 6 is a view to explain a method for displaying a preview image according to an exemplary embodiment.

FIG. 6 illustrates that, if a user 610 selects a preview button on the input unit 430 of an image forming apparatus 620 (S5), the image forming apparatus 620 transmits a preview image request of the first and second pages to an index server 630 which is the second server (S10).

Then, the index server 630 transmits a preview image request on the first two pages of the print data to a preview engine 640, which is the generating unit (S15).

The preview engine 640 requests the spool server 650 for print data (S20) and receives print data in response to this request (S25).

The preview engine 640 generates a preview image of the first two pages of the print data (S30), and transmits the generated preview image to the image forming apparatus 620 (S35).

The image forming apparatus 620 stores the transmitted preview image (S40) and displays the preview image of the first page on the display unit 410 (S45).

If a preview image request on the second page is input in the input unit 430 of the image forming apparatus 620 (S50), the display unit 410 may display the preview image of the second page stored in the storage unit 460 (S55).

FIG. 5B illustrates that, if the next page button on the display unit 410 is selected, a preview image request for the second page is input to the input unit 430. The display unit 410 in FIG. 5B is realized in the form of touch screen, thus performing the functions of the input unit 430 as well.

According to the control of the control unit 450, during operation S55, the communication interface unit 440 displays a preview image of the second page on the display unit 410 while transmitting a preview image request of the third page to the index server 630 (S60).

Operation S60 may be set to be triggered according to operation S50.

The index server 630 transmits the preview image request of the third page to the preview engine 640 (S65), and the preview engine 640 generates a preview image on the requested pages (S70).

FIG. 6 illustrates an example of transmitting print data on total pages during operation S25, but print data request on the third page can be given to the spool server 650 since operation S70.

The preview engine 640 transmits a preview image of the third generated page to the image forming apparatus 620 (S75), and the image forming apparatus (620) stores the transmitted preview image (S80).

Since then, operations from S50 to S80 may be carried out repeatedly.

Accordingly, it takes less time to generate a preview image and to display the generated preview image on the image forming apparatus 620.

Figure 7:
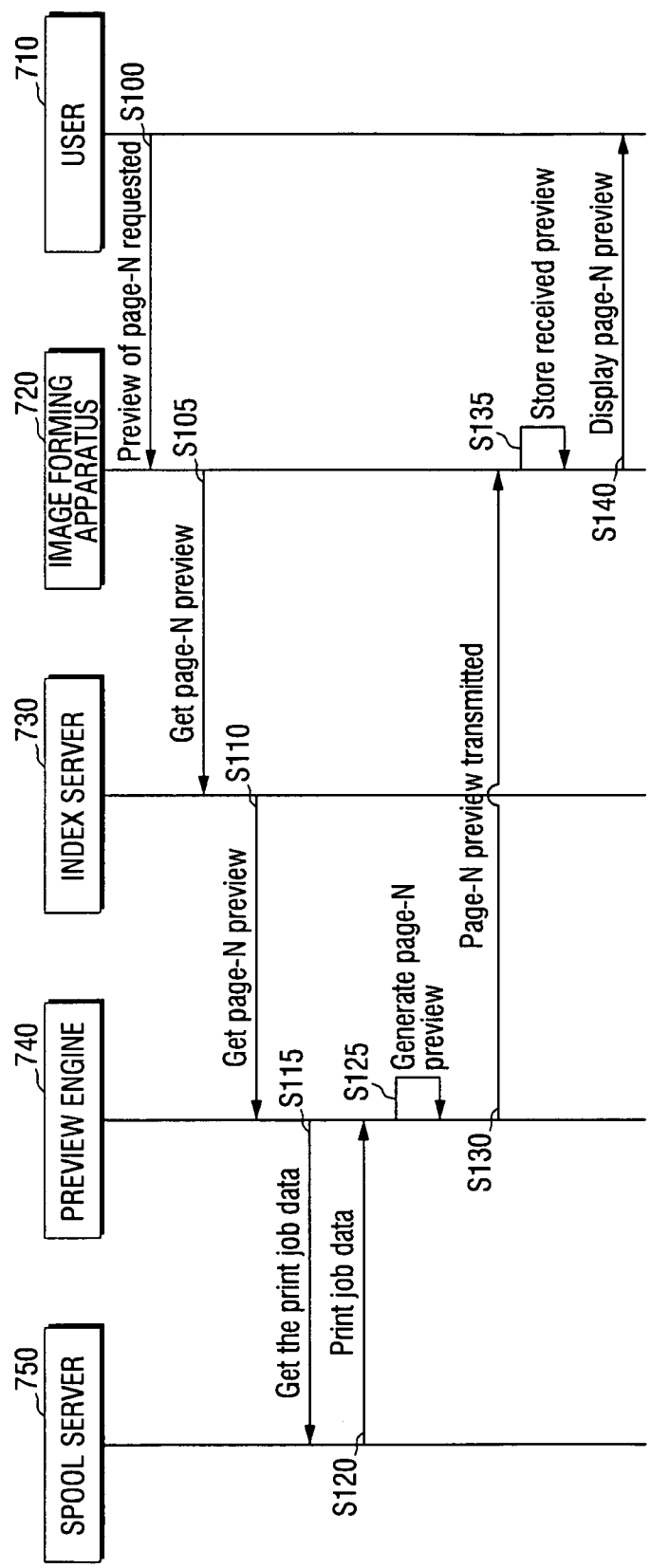
FIG. 7 is a view to explain a method for displaying a preview image of an image forming apparatus according to another embodiment.

FIG. 7 is a view to explain a method for displaying a preview image of an image forming apparatus according to another embodiment of the present invention.

With reference to FIG. 7, a user (710) can request a preview image on a designated page N to the image forming apparatus 720 (S100).

The image forming apparatus 720 transmits a preview image request on the designated page N to the index server 730 (S105), and the index server 730 transmits a preview image request on the designated page N to the preview engine 740 (S110).

The preview engine 740 requests the spool server 750 for print data (S115) and receives the print data from the spool server 750 in response to the request (S120).

The preview engine 740 generates a preview image on the designated page N (S125), and transmits the generated preview image to the image forming apparatus 720 (S130).

The image forming apparatus 720 stores the received preview image (S135), and displays the preview image of the designated page N (S140).

Then, the above mentioned operations from S100 to S140 can be performed repeatedly, if a user 710 requests a preview image on other pages.

Accordingly, it takes less time to generate a preview image and display the generated preview image on the image forming apparatus 720.

Figure 8:
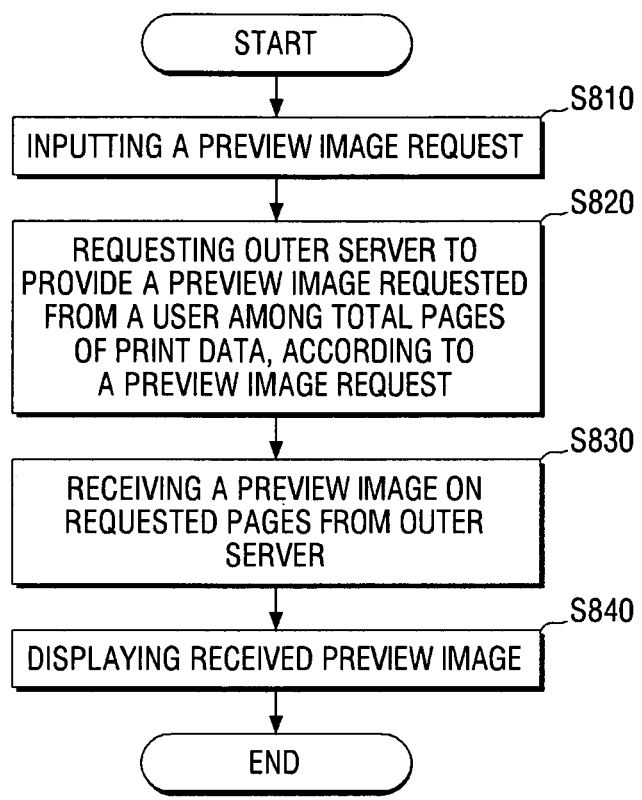
FIG. 8 is a flowchart to explain a method for displaying a preview image of an image forming apparatus according to an exemplary embodiment.

FIG. 8 is a flow chart to explain a method for displaying a preview image of an image forming apparatus according to an exemplary embodiment.

With reference to FIG. 8, the method of displaying a preview image of the image forming apparatus receives a preview image request from the input unit 430 (S810).

Since then, according to the preview image request, the server unit 200 is requested to provide the preview image on a page requested from a user among total pages of print data to the server unit 200 (S820).

As the control unit 450 in the image forming apparatus 400 controls the communication interface unit 440, the communication interface unit 440 can request the server unit 200 to provide a preview image according to a various arrangement of the first server 310, the second server 320 and the generating server 330, as illustrated in FIGS. 2 and 3A to 3C.

Then, a preview image requested from a user is received in the communication interface unit 440 from the server unit 200 (S830) and the received preview image is displayed on the display unit 410 (S840).

A method for displaying a preview image of the image forming apparatus stores the received preview image, displays a preview image of the preceding page among a plurality of preview images, if the received preview image includes of a plurality of images. The method displays a preview image of a 1st following page among the stored preview images, if a display request on a preview image of the 1st following page coming after the preceding page is input, and requests the server unit 200 to provide a preview image of the 2nd following page, if a preview image of the 2nd following image coming after the 1st following image is not stored while the preview image of the 1st following image is being displayed; and receives and stores the preview image of the 2nd following page.

Accordingly, it takes less time to generate a preview image and display the generated preview image on the image forming apparatus 400.

Hereinafter, the explanation on the overlapped part will be omitted.

FIG. 9 is a flow chart of providing a preview image of a server according to an exemplary embodiment.

With reference to FIG. 9, a method for providing a preview image of a server receives print data from at least one host apparatus 100 and stores the received print data in the storage unit 210 (S910).

The communication interface unit 220 receives a preview image request from one of at least one image forming apparatus 100 (S920).

Since then, according to the received preview image request, the generating unit 230 generates a 'preview image on a page requested from a user among total pages of the stored print data (S930). Hereinafter, the generating unit 230 can be arranged in a various forms as described in FIGS. 2 and 3A to 3C.

Then, the preview image is transmitted from the communication interface unit 220 to the image forming apparatus, which requested the preview image (S940).

Accordingly, it talks less time to generate a preview image and display the generated preview image in the image forming apparatus 400.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An image forming system which performs a pull printing of the print data stored in a server, the image forming system comprising:
   an image forming apparatus which requests the server to provide a preview image on a first page requested from a user among total pages of print data according to the preview image request; and
   the server which generates a preview image of the first page according to the received preview image request, and transmits the generated preview image to the image forming apparatus which requested the preview image,
   wherein the image forming apparatus receives a preview image of the requested page from the server and displays a user interface (UI) having the received preview image,
   wherein the image forming apparatus automatically requests from the server to generate and transmit a preview image of a third page among the total pages of print data, in response to a request by the user to display a preview image of a second page among the total pages of print data.

2. The image forming system as claimed in claim 1, wherein the image forming apparatus comprises:
   an input unit which receives a preview image request;
   a communication interface unit which requests the server to provide a preview image on a page requested from a user among total pages of the print data according to the preview image request, and receives a preview image of the requested pages from the server;
   a display unit which displays a UI having the received preview image; and
   a print engine unit which receives the print data from the server and prints the print data by performing the pull printing of the print data stored in the server.

3. The image forming system as claimed in claim 2, wherein the image forming apparatus further comprises:
   a control unit which controls the communication interface unit to transmit to the server a preview image request according to a preview image request policy which is set previously.

4. The image forming system as claimed in claim 2, wherein the communication interface unit receives a preview image on designated pages according to a preview image request on the designated pages from a user among the total pages.

5. The image forming system as claimed in claim 2, further comprising a storage unit which stores the received preview image.

6. The image forming system as claimed in claim 5, wherein the display unit displays a preview image of one page among the requested pages, and
   the storage unit stores a preview image of at least one following page coming after the one page.

7. The image forming system as claimed in claim 5, wherein the image forming apparatus further comprises:
   a control unit which controls the display unit to display a preview image of a preceding page among a plurality of preview images, if the received preview image consists of a plurality of images, and to display a preview image of a first following page among the stored preview images, if a display request on a preview image of the first following page coming after the preceding page is input.

8. The image forming system as claimed in claim 7, wherein the communication interface unit requests the server to provide a preview image of the second following page, if a preview image of the second following page coming after the first following page is not stored while the preview image of the first following page is being displayed, and
   the storage unit receives and stores the preview image of the second following page.

9. The image forming system as claimed in claim 1, wherein the server comprises:
   a storage unit which receives print data from at least one host apparatus and stores the received print data;
   a communication interface unit which receives a preview image request from one of the at least one image forming apparatuses; and
   a generating unit which generates a preview image according to the received preview image request;
   wherein the communication interface unit transmits the generated preview image to the image forming apparatus which requested the preview image.

10. The image forming system as claimed in claim 9, wherein the storage unit stores attribute information of the print data and user information, and
    the generating unit generates the preview image based on the stored print data, the attribute information of the print data, and the user information.

11. The image forming system as claimed in claim 9, wherein the attribute information of the print data includes a print data name, a number of total pages and a size of the print data, a size and a direction of a designated print paper, a generation date and time in the host apparatus, a registration date and time in the server, a color information, an information whether print data remains or not after performing printing, a designated option information including a duplex or simplex print, and an image forming apparatus which is allowed to output the print data concerned.

12. The image forming system as claimed in claim 10, wherein the storage unit includes a first server unit where the received print data is stored and a second server unit where the attribute information of the print data and the user information are stored.

13. The image forming system as claimed in claim 12, wherein the first server unit is a spool server and the second server unit is an index server.

14. The image forming system as claimed in claim 12, wherein the first server unit and the second server unit are integrated into one element.

15. The image forming system as claimed in claim 1, wherein the image forming apparatus includes an input unit to receive a request for a preview image of any page from among total pages of print data according to a user input specifying a page number from among total pages of print data.

16. The image forming system as claimed in claim 1, wherein the image forming apparatus further comprises:
   a communication interface unit to request the server to provide a preview image on a page requested from a user among total pages of the print data according to the preview image request, and to receive a preview image of the requested page from the server; and
   a control unit which controls the communication interface unit to transmit to the server a preview image request according to a preview image request policy which is set previously,
   wherein the preview image request policy includes a policy to request a preview image of the page requested from the user, and to request a preview image of a page subsequent to the page requested from the user, among total pages of print data.

17. The image forming system as claimed in claim 1, wherein the server comprises:
   a storage which receives print data from at least one host apparatus and which stores the received print data, attribute information of the print data, and user information of the user;
   a communication interface which receives a request from the image forming apparatus for a preview image of the second page, and the request from the image forming apparatus for a preview image of the third page; and
   a preview engine which generates the preview image of the second page and the preview image of the third page,
   wherein, in response to a request by the user to display a preview image of a second page among the total pages of print data, the preview engine generates the preview image of the second page and the preview image of the third page using the stored print data, the stored attribute information of the print data, and the stored user information.

18. The image forming system as claimed in claim 17, wherein the print data is stored in the storage in the form of PCL, PCLXL, or PostScript, and the preview engine generates the preview image of the second page and the preview image of the third page as image files.

19. A preview-image displaying method performed by an image forming system having a server and an image forming apparatus and performs pull printing of print data stored in the server, the method comprising:
   requesting, by the image forming apparatus, a server to provide a preview image on a first page requested from a user among total pages forming print data according to the preview image request;
   generating, by the server, a preview image of the first page according to the received preview image request;
   transmitting, by the server, the generated preview image to the image forming apparatus which requested the preview image;
   receiving, by the image forming apparatus, a preview image of the requested first page from the server; and
   displaying, by the image forming apparatus, a user interface (UI) having the received preview image,
   wherein, in response to a request by the user to display a preview image of a second page, the method further comprises automatically requesting from the server, by the image forming apparatus, to generate and transmit a preview image of a third page among the total pages of print data.

20. The preview-image displaying method as claimed in claim 19, the method further comprising:
   receiving, by the image forming apparatus, a request for a preview image through an input unit; and
   printing, by the image forming apparatus, the print data by performing the pull printing of the print data stored in the server.

21. The preview-image displaying method as claimed in claim 19, wherein the receiving receives a preview image on designated pages, according to a preview image request on the designated pages from a user among the total pages.

22. The preview-image displaying method as claimed in claim 19, further comprising:
   storing, by the image forming apparatus, the received preview image.

23. The preview-image displaying method as claimed in claim 22, wherein the displaying displays a preview image of one page among the requested pages, and the storing stores a preview image of at least one following page coming after the one page.

24. The preview-image displaying method as claimed in claim 19, further comprising:
   storing, by the image forming apparatus, the received preview image;
   displaying, by the image forming apparatus, a preview image of a preceding page among a plurality of preview images, if the received preview image includes a plurality of images;
   displaying, by the image forming apparatus, a preview image of a first following page among the stored preview images, if a display request on a preview image of the first following page coming after the preceding page is input;
   requesting, by the image forming apparatus, the server to provide a preview image of a second following page, if a preview image of the second following image coming after the first following image is not recorded while the preview image of the first following image is being displayed; and
   receiving and storing the preview image of the second following page.

25. The preview-image displaying method as claimed in claim 19, further comprising:
   receiving, by the server, print data from the at least one host apparatus and storing the received print data; and
   receiving, by the server, a request for a preview image from one of the at least one image forming apparatus.

26. The preview-image providing method as claimed in claim 25, further comprising:
   storing, by the server, an attribute information of the print date and a user information,
   wherein the generating the preview image generates the preview image based on the stored print data, the attribute information of the print data, and the user information.

* * * * *

UNITED STATES PATENT AND TRADEMARK OFFICE
CERTIFICATE OF CORRECTION

| | | |
|---|---|---|
| PATENT NO. | : 9,154,655 B2 | Page 1 of 1 |
| APPLICATION NO. | : 12/923991 | |
| DATED | : October 6, 2015 | |
| INVENTOR(S) | : Seong-taek Park | |

It is certified that error appears in the above-identified patent and that said Letters Patent is hereby corrected as shown below:

In the Claims

Claim 26, Column 14, Line 55

Delete "preview-image providing method" and insert --preview-image displaying method--, therefor.

Signed and Sealed this
Ninth Day of February, 2016

Michelle K. Lee
*Director of the United States Patent and Trademark Office*